(12) United States Patent
Lewis et al.

(10) Patent No.: US 10,482,300 B2
(45) Date of Patent: Nov. 19, 2019

(54) SYSTEM FOR AUTOMATED CHECKOUT USING METAL DETECTION

(71) Applicant: Walmart Apollo, LLC, Bentonville, AR (US)

(72) Inventors: Steven Lewis, Bentonville, AR (US); Nicholaus Adam Jones, Fayetteville, AR (US); Matthew Dwain Biermann, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/880,498

(22) Filed: Jan. 25, 2018

(65) Prior Publication Data

US 2018/0225490 A1    Aug. 9, 2018

Related U.S. Application Data

(60) Provisional application No. 62/456,663, filed on Feb. 9, 2017.

(51) Int. Cl.
*G06K 7/14* (2006.01)
*G06K 7/10* (2006.01)

(52) U.S. Cl.
CPC ....... *G06K 7/1417* (2013.01); *G06K 7/10881* (2013.01); *G06K 7/1413* (2013.01); *G06K 2007/10524* (2013.01)

(58) Field of Classification Search
CPC ............. G06K 7/10881; G06K 7/1413; G06K 7/1417; G06K 2007/10524; G06Q 20/208; G06Q 30/00; G07G 1/0063; G07G 1/0081

USPC ..................................................... 235/462.1
See application file for complete search history.

(56) References Cited

U.S. PATENT DOCUMENTS

| | | |
|---|---|---|
| 3,898,433 A | 8/1975 | Sallet |
| 4,248,389 A | 2/1981 | Thompson et al. |
| 4,588,211 A | 5/1986 | Greene |
| 4,707,251 A | 11/1987 | Jenkins et al. |
| 5,283,422 A * | 2/1994 | Storch ..................... G06F 11/14 235/375 |
| 5,670,882 A * | 9/1997 | Brandolino .......... G01R 33/022 324/326 |
| 5,755,335 A | 5/1998 | Michelotti et al. |

(Continued)

FOREIGN PATENT DOCUMENTS

| | | | | |
|---|---|---|---|---|
| EP | 412351 A1 * | 2/1991 | ............... | B07C 5/15 |
| WO | WO-03095198 A1 * | 11/2003 | ............ | B32B 27/20 |
| WO | 2010117741 | 10/2010 | | |

*Primary Examiner* — Seung H Lee

(57) ABSTRACT

A system and method are provided for automated checkout using metal detection to determine a location of a universal product code (UPC) or another physical item identifier (PID) associated with a given item. A set of sensors detects a location of a physical identifier (PID) associated with at least one item. A set of signal components outputs an indication of the detected PID location on the given item. The output PID location indication directs a movement or change in position of the given item to place the PID in a readable proximity of a scanner component. The PID location indication may include an audible indication, a visual indication, and/or a haptic indication to a user. The PID location indication may include instructions to an orientation component for automatically repositioning the item within the readable proximity of the scanner component.

19 Claims, 7 Drawing Sheets

(56) References Cited

U.S. PATENT DOCUMENTS

| | | | |
|---|---|---|---|
| 5,966,457 A | 10/1999 | Lemelson | |
| 6,330,973 B1 | 12/2001 | Bridgelall et al. | |
| 6,729,544 B2* | 5/2004 | Navon | G06K 7/14 |
| | | | 209/584 |
| 7,391,338 B2 | 6/2008 | Eren et al. | |
| 9,842,239 B2* | 12/2017 | Suman | G06K 7/10732 |
| 2007/0267501 A1* | 11/2007 | Jovanovski | G06K 7/10722 |
| | | | 235/472.01 |
| 2009/0123780 A1* | 5/2009 | Ingvert | G06K 19/06187 |
| | | | 428/827 |
| 2009/0212113 A1* | 8/2009 | Chiu | G06K 7/14 |
| | | | 235/462.41 |
| 2010/0306755 A1* | 12/2010 | Fitch | G06F 8/65 |
| | | | 717/168 |
| 2012/0154157 A1* | 6/2012 | George | G08B 21/02 |
| | | | 340/584 |
| 2014/0183261 A1* | 7/2014 | Ung | G06K 7/0008 |
| | | | 235/439 |
| 2014/0230371 A1 | 8/2014 | Taylor et al. | |
| 2016/0125217 A1* | 5/2016 | Todeschini | G06K 7/1404 |
| | | | 348/552 |
| 2018/0336386 A1* | 11/2018 | Holub | G06K 7/1447 |

* cited by examiner

SYSTEM FOR AUTOMATED CHECKOUT USING METAL DETECTION

BACKGROUND

A barcode is a machine-readable product identifier used by retailers and manufacturers to identify, track, ship, package, and/or sell goods. Examples of barcodes include a universal product codes (UPC) or a matrix barcode. A barcode may be located on a product package, tag, sticker on the product, a card, or other location associated with the product. To read the barcode, a scanner must be within proximity to the barcode to enable the scanning device to read information encoded within the barcode and/or retrieve other information from a database corresponding to the barcode. Additionally, the barcode position relative to the scanner affects readability of the barcode by the scanner. Users typically manually perform a visual search of the item to find the barcode on the product and correctly position the barcode prior to scanning. This manual procedure may be tedious and time consuming for users.

Moreover, the barcode location on one product is often different than the barcode location on a different product. Therefore, even if a user is familiar with the location of the barcode on one product, the user may still encounter difficulty locating the barcode on other products. Manually scanning barcodes on multiple different products in this manner may be inefficient and frustrating for users.

SUMMARY

Examples of the disclosure provide a handheld scanning device. A scanner component of the handheld scanning device reads a physical identifier (PID) associated with one or more items. One or more sensors detect a location of the PID relative to the item. One or more signal components output an indication of the detected location relative to the item, providing direction for orienting the detected PID relative to the scanner component for efficient reading by the handheld scanning device.

Other examples provide an automated scanning system. A scanner component reads a PID associated with an item. One or more sensors detect a location of a PID relative to an item. One or more signal components output an indication of the detected location relative to the item, providing direction for orienting the detected PID relative to the scanner component for efficient reading by the automated scanning system.

Still other examples provide one or more computer storage devices having computer-executable instructions stored thereon for autonomous scanning. The computer-executable instructions, on execution by a computer, cause the computer to perform operations to detect a location of a PID relative to an item associated with the PID using sensor data from one or more sensors; generate an indication of the detected location; and output the generated indication via a user interface component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, some examples enable automatic physical identifier (PID) scanning. In some examples, a set of one or more sensors detects a location of a PID on an item by detecting magnetic and/or metallic particles associated with the PID. This enables the sensors to automatically determine the location of the PID without the PID being directly over or under the scanner. This enables automatic and efficient location of the PID.

Other examples provide a set of one or more signal components to output a PID location indication to a user via an output device. The PID location indication may be provided in an audio format, a video/visual format, and/or a haptic format. This assists a user in locating the PID more quickly and efficiently, and/or orienting the PID relative to the scanner in such a way as to improve readability by the scanner.

Still other examples generate a PID location indication during scanning of an item. The PID location indication provides signals and/or instructions indicating a direction of item orientation to bring the scanner component into readable proximity of the PID. The PID location indication increases speed of item scanning and improves user efficiency. The PID location indication further reduces the number of unsuccessful scanning attempts before the PID is correctly positioned for scanning.

Yet other examples provide an orientation component for physically orienting the item to facilitate readability of the PID by a scanner based on a PID location indication. The orientation component moves or otherwise manipulates the item to improve the positioning of the item for scanning of the PID. This removes or reduces the need for user interaction with the item during scanning and enables automatic positioning and scanning of item PIDs.

Figure 1:
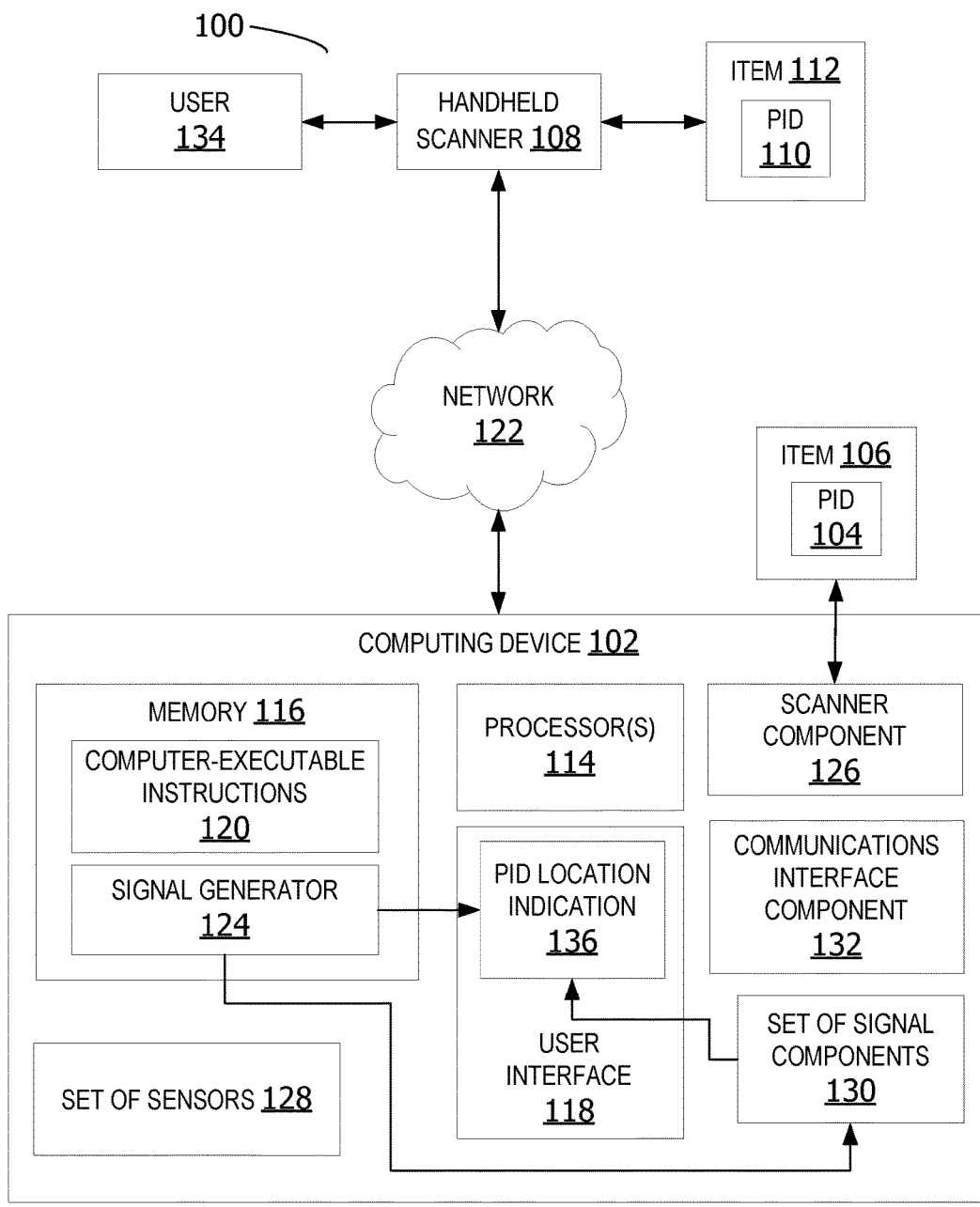
FIG. 1 is an exemplary block diagram illustrating a system for automatic scanning of an item physical identifier (PID).

Referring again to FIG. 1, an exemplary block diagram illustrates a system 100 for automatic scanning of a PID. In the example of FIG. 1, the computing device 102 represents a system for automatic PID scanning.

The computing device 102 represents any device executing instructions (e.g., as application programs, operating system functionality, or both) to implement the operations and functionality associated with the computing device 102. The computing device 102 in this example is a scanning device for reading a PID on an item, such as PID 104 on item 106.

A PID is a product identification code. A PID may be implemented as, for example but without limitation, a universal product code (UPC), barcode, or matrix (two dimensional) barcode. A matrix barcode may also be referred to as a data matrix barcode. An example of a matrix barcode is a quick response (QR) code.

The computing device 102 in some examples may be implemented as a desktop personal computer, kiosk, table-top device, industrial control device, wireless charging station, and/or an electric automobile charging station. Additionally, the computing device may represent a group of processing units or other computing devices.

The computing device 102 in other examples may be implemented as a mobile computing device or any other portable device. In some examples, the mobile computing device includes a mobile telephone, laptop, tablet, computing pad, netbook, gaming device, and/or portable media player. In some examples, the computing device is implemented as a handheld scanning device, such as handheld scanner 108 for scanning the PID 110 on item 112. In these examples, handheld scanner 108 may include all or a portion of the components depicted as implemented in computing device 102. Handheld scanner 108 is an illustrative example of one implementation of computing device 102.

In some examples, the computing device 102 includes one or more processor(s) 114, a memory 116, and at least one user interface 118. The one or more processor(s) 114 include any quantity of processing units programmed to execute computer-executable instructions 120 for implementing aspects of the examples. The instructions may be performed by a single processor or by multiple processors within the computing device 102, or performed by a processor external to the computing device 102. In some examples, the processor(s) 114 are programmed to execute instructions such as those illustrated in the figures (e.g., FIG. 8 and FIG. 9).

In some examples, the processor(s) 114 represent an implementation of analog techniques to perform the operations described herein. For example, the operations may be performed by an analog computing device and/or a digital computing device.

The computing device 102 further has one or more computer readable media such as the memory 116. The memory 116 includes any quantity of media associated with or accessible by the computing device 102. The memory 116 may be internal to the computing device 102 (as shown in FIG. 1), external to the computing device (not shown), or both (not shown). In some examples, the memory 116 includes read-only memory and/or memory wired into an analog computing device.

The memory 116 stores data, such as one or more applications. The applications, when executed by the processor(s) 114, operate to perform functionality on the computing device 102. Exemplary applications include universal product code (UPC) reader programs, matrix barcode reader, and the like. The applications may communicate with counterpart applications or services such as web services accessible via a network 122. For example, the applications may represent downloaded client-side applications that correspond to server-side services executing in a cloud.

The memory 116 further stores one or more computer-executable components. The signal generator 124, when executed by the processor(s) 114 of the computing device 102, causes the one or more processors to detect a location of a PID relative to an item associated with the PID using sensor data obtained from one or more sensors; generate an indication of the detected location; and output the generated indication via a user interface component.

In some examples, a scanner component 126 is configured to read the PID 104 associated with the item 106. In some examples, if the scanner component 126 cannot read the PID 104, the signal generator 124 obtains sensor data from one or more sensors in a set of sensors 128. The set of sensors 128 are configured to detect a location of the PID 104 relative to the item 106.

The signal generator 124 in some examples, analyzes the sensor data to identify the location of the PID 104. The signal generator 124 generates a PID location indication 136 based on the obtained sensor data from the set of sensors 128 to one or more users and/or to an orientation component (shown in FIG. 3 and FIG. 4 below). An orientation component is an autonomous component that orients the item to align the PID with the scanner component 126. For example, the orientation component may be implemented as a robotic arm, motorized rollers, an actuator, or the like.

The PID location indication 136 is output to the user 134 via the user interface component 118. In some examples, the PID location indication 136 is output to the user interface component 118 via a set of one or more signal components 130. The set of signal components 130 may generate a PID location indication output. The set of signal components 130 may include one or more output devices, such as, but not limited to, speakers, a sound card, a display screen, an image projector, a microphone, a vibration motor, and/or a set of one or more lights. The set of lights in some examples include one or more light emitting diode (LED) lights.

The PID location indication 136 provides output or instructions indicating a direction of movement or orientation relative to the item 106 to bring the PID 104 into readable proximity of the scanner component 126. The readable proximity is the location, position, and/or distance required for the scanner component 126 to accurately read the PID 104.

In other examples, system 100 optionally includes a handheld scanner 108. In these examples, the PID location indication is an indicator providing output and/or instructions directing a user 134 or an orientation component (not shown) to move the handheld scanner 108 and/or the item 112. The PID location indication indicates a direction of movement relative to an orientation of item 112 and/or movement of handheld scanner 108 to bring the PID 110 within readable proximity of a scanner component of the handheld scanner 108.

In some examples, the computing device 102 includes a communications interface component 132. The communications interface component 132 includes a network interface card (NIC) and/or computer-executable instructions (e.g., a driver) for operating the network interface card. Communication between the computing device 102, the handheld scanner 108, a remote data storage device, and/or other devices may occur using any protocol or mechanism over any wired or wireless connection, such as network 122. In some examples, the communications interface is operable with short range communication technologies such as by using near-field communication (NFC) tags.

In some examples, the PID location indication is output to one or more users via the user interface component 118. The user interface component 118 optionally includes a graphics card for displaying data to the user 134 and receiving data from the user 134. The user interface component 118 may also include computer-executable instructions (e.g., a driver) for operating the graphics card. Further, the user interface component 118 may include a display (e.g., a touch screen display or natural user interface) and/or computer-executable instructions (e.g., a driver) for operating the display. The user interface component 118 may also include one or more of the following to provide data to the user 134 or receive data from the user 134: speakers, a sound card, a camera, a microphone, a vibration motor, one or more accelerometers, a BLUETOOTH brand communication module, global positioning system (GPS) hardware, and a photoreceptive light sensor. For example, the user 134 may input commands or manipulate data by moving the computing device in a particular way.

Figure 2:
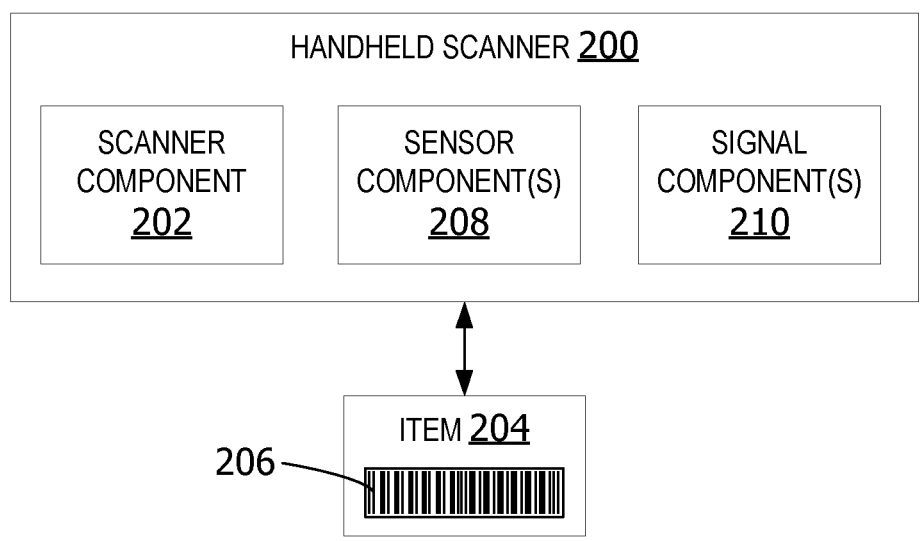
FIG. 2 is an exemplary block diagram illustrating a handheld scanner for scanning a PID.

FIG. 2 is an exemplary block diagram illustrating a handheld scanner for scanning a PID. Handheld scanner 200 may be an illustrative example of one implementation of computing device 102 in FIG. 1. The handheld scanner 200 is a mobile scanning device for reading a PID 206 on an item 204. The handheld scanner 200 may be a wired or wireless scanning device.

In some examples, the handheld scanner 200 includes a scanner component 202 for scanning a PID 206 of item 204. The scanning component 202 reads the PID 206 when the PID 206 is within a readable proximity of the scanner component 202.

The handheld scanner 200 includes one or more sensor component(s) 208 for detecting a location of the PID 206 relative to the item 204. The location of the PID may be a location on a top, a bottom, or a given side, or another portion of the item 204. The item 204 in this example is a rectangular shaped item. In other examples, the item 204 may include a cylinder-shaped object, a circular shaped object, a disk-shaped object, or any other shaped object.

The sensor component(s) 208 includes one or more sensors capable of detecting a PID on an item. In some examples, one or more sensors of sensor component(s) 208 may detect metallic particles and/or magnetic particles associated with the PID 206. For example, sensor component(s) 208 may include a magnetic reader and/or a metal detector. The sensor component(s) 208 generates sensor data indicating the location of the PID relative to the item 204.

The signal component(s) 210 in this example includes a signal generator, such as signal generator 124 in FIG. 1. The signal generator analyzes the sensor data from sensor component(s) 208 and creates a PID location indication based on the sensor data. The signal component(s) 210 output the PID location indication to a user and/or an orientation component for repositioning of the item 204 to bring PID 206 into readable orientation relative to scanner component 202.

Figure 3:
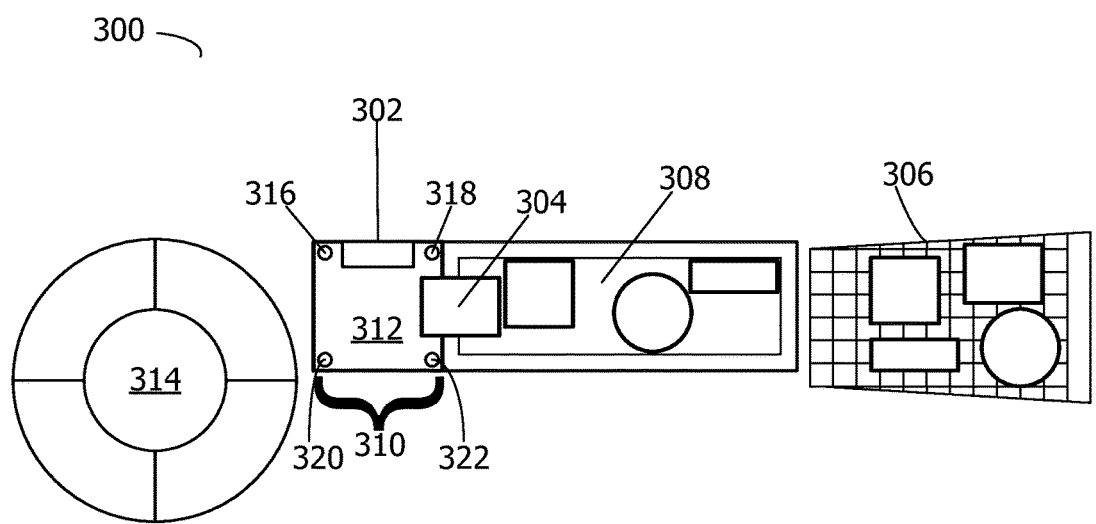
FIG. 3 is an exemplary block diagram illustrating an automated checkout lane for scanning a PID.

FIG. 3 is an exemplary block diagram illustrating an automated checkout lane for scanning a PID. The automated scanning system 300 in this example includes a scanner component 302 for scanning a PID on one or more items, such as item 304. Other aspects of the disclosure, such as computing device 102 in FIG. 1, may be implemented within automated scanning system 300 in suitable locations (not shown). For example, computing device 102 may be incorporated into an area adjacent with scanner component 302, or may be remote from and communicatively coupled to scanner component 302, in this illustrative example.

In some examples, a user enters a checkout lane with one or more items in a shopping cart 306. The user places the one or more items on a conveyor belt 308. A set of sensors 310 gathers sensor data associated with the location of a PID on item 304. A PID location indication is output to an orientation component 312. The orientation component 312 physically changes an orientation of the item 304 to place the detected PID associated with item 304 within a readable proximity to the scanner component 302. When the scanner component 302 reads the PID on item 304, item 304 may be placed in a bagging area 314.

In this example, the set of sensors 310 includes fours sensors, sensor 316, 318, 320, and 322. However, in other examples, the set of sensors 310 may include a single sensor, as well as two or more sensors.

In one example, the orientation component includes a robotic arm, actuator, rotation device, or other autonomous orientation means to rotate the item to align the PID location of the item with the scanner component.

Figure 4:
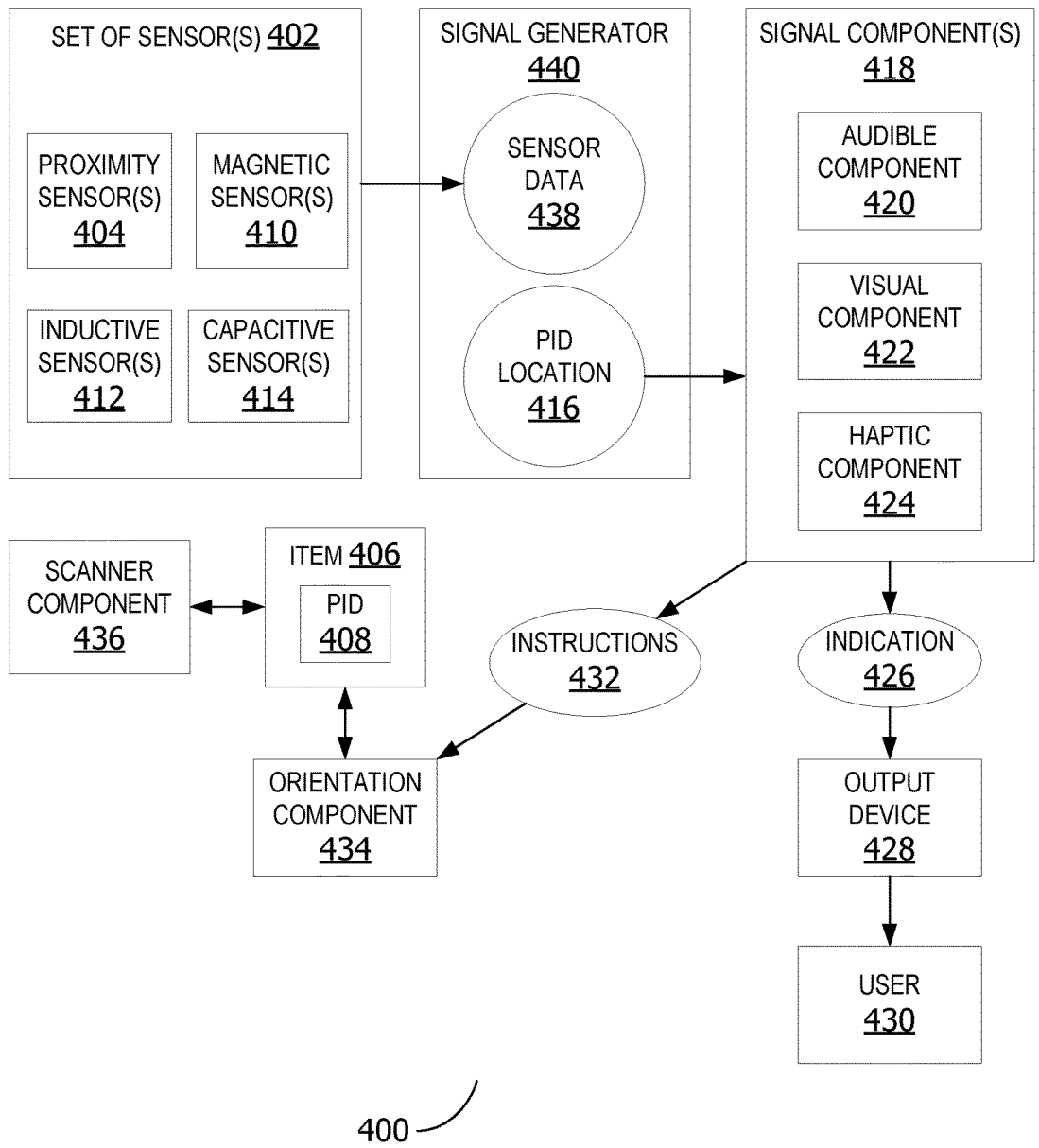
FIG. 4 is an exemplary block diagram illustrating a system for outputting a PID location indication.

FIG. 4 is an exemplary block diagram illustrating a system for outputting an PID location indication. The scanning system 400 includes a set of sensor(s) 402 for detecting a location of a PID. The set of sensor(s) 402 includes one or more sensors for detecting the PID.

The set of sensor(s) 402 in some examples includes one or more proximity sensor(s) 404. A proximity sensor is a non-contact sensor for detecting an object. In some examples, a proximity sensor emits an electromagnetic (EM) field or EM radiation. For example, a proximity sensor may emit infrared radiation (IR) for detecting the item 406 and/or the PID 408 associated with the item 406.

The set of sensor(s) 402 in other examples may include one or more magnetic sensor(s) 410. A magnetic sensor is a device for detecting and/or measuring magnetic fields. A magnetic sensor detects magnetic particles associated with the PID 408. The magnetic sensor may be implemented as a metal detector.

Other examples include one or more inductive sensor(s) 412. An inductive sensor is a device for detecting metallic objects, such as, but not limited to, a metal detector.

The set of sensor(s) 402 may optionally include one or more capacitive sensor(s) 414. A capacitive sensor is a device for detecting conductive objects. A capacitive sensor uses capacitance between two conductive surfaces to make a non-contact measurement of distance to the item 406 and/or the PID 408.

The set of sensor(s) 402 generates sensor data 438. The signal generator 440 receives the sensor data 438 from one or more of the sensors in the set of sensors 402. The signal generator 440 analyzes the received sensor data to determine a PID location 416. The signal generator 440 transmits the PID location 416 to one or more signal component(s) 418. A signal component may include an audible component 420, a visual component 422, and/or a haptic component 424.

In some examples, the signal component includes a user interface, a display, and/or a communication channel. The user interface in some examples is a graphical user interface (GUI). In other examples, the user interface is a command line interface or a menu driven interface.

A display in some examples is a display screen. The display screen may be a touch screen. In other examples, the display is a holographic display.

A communication channel may include a wired communication channel, such as an Ethernet connection. The communication channel in other examples is implemented as a wireless communication channel, such as a BLUETOOTH or W-Fi connection. In other examples, the communication channel may include radio transmissions.

The audible component 420 includes a speaker, sound card, or other sound generation component. The visual component 422 may include a display screen, a holographic generator, a light, or other visual output device. The haptic component 424 is an output device for generating haptic output. Haptic output may include vibrations, forces, motions, and/or tactile output.

The signal component(s) 418 generate a PID location indication 426. The indication 426 may include an audio indicator, such as a beep sound, a whistle, a verbal indicator, or other audible sound. The audio indicator 426 may include a change in frequency, pitch, or tone to indicate the scanner is moving closer to the PID or further away from the PID. For example, the audio indicator 426 may include an audible tone that increases in frequency relative to the proximity of the scanner component relative to the PID 408.

In other examples, the indication 426 includes a visual indicator. A visual indicator may include a graphical output, such as an arrow, an image of the item highlighting the PID location on a display, a stationary light, a flashing light, a plurality of lights, or another visual indicator. A change in state of the light flashing may indicate a proximity of the PID. For example, the visual indicator may include a light that changes state by increasing a frequency of flashing as the scanner component moves into closer proximity to the PID 408.

In other examples, the PID location indication 426 is a haptic indicator. A haptic indicator may include a vibration, a texture, a motion, or other tactile or kinesthetic output. For example, a haptic indicator may increase strength or intensity of a vibration as the scanner component comes within closer proximity to the PID 408.

In still other examples, the indication 426 is a combination of an audible indication, a visual indication, and/or a haptic indication. For example, the indication may include both an audible indication and a visual indication in which the frequency of beeps and light flashes increase as the scanner component moves into closer proximity of the PID 408.

In other examples, the indication 426 includes a combination of a visual indication and a haptic indication. In still other examples, the indication 426 includes an audible indication and a haptic indication. In yet other examples, the indication 426 includes a visual indication, an audible indication, and a haptic indication. An output device 428 may provide the indication 426 to the user 430.

In yet another example, the indication 426 includes directions to the user 430 for product orientation relative to the scanner component 436. The directions may be output as text, speech, or symbols, such as arrows or graphical images.

In other examples, the indication may be output by signal component(s) 418 as instructions 432, which may be a set of orientation instructions to orient or re-orient the item in such a way the aligns the PID 408 with scanner component 436, or otherwise provides for readability of PID 408 by scanner component 436. The instructions 432 may be transmitted to an autonomous orientation component 434. The instructions 432 may direct the orientation component 434 to re-orient the item 406 such that the PID 408 is within readable proximity to the scanner component 436. The orientation component 434 may be implemented as a robotic arm, a mechanical arm, motorized rollers, or other actuator device for automatically positioning or re-positioning of the item 406.

When the PID 408 is correctly positioned within readable proximity of the scanner component 436, the scanner component 436 reads the PID 408. If the PID 408 is not in readable position, the process iteratively continues by determining a PID location 416 and outputting an indication 426 and/or instructions 432 until the PID 408 is successfully scanned by the scanner component 436, or the process is otherwise terminated.

In yet another example, instructions 432 may be output to the orientation component 434. If the orientation component is unable to properly position the item autonomously, the indication 426 may then be output to the user 430. The user then utilizes the instructions provided by the indication 426 to complete the re-positioning of the item for scanning. In this illustrative example, the autonomous orientation component performs a first portion of the re-positioning of the item and the user performs the second portion of the re-positioning of the item until the PID 408 is within readable proximity.

Figure 5:
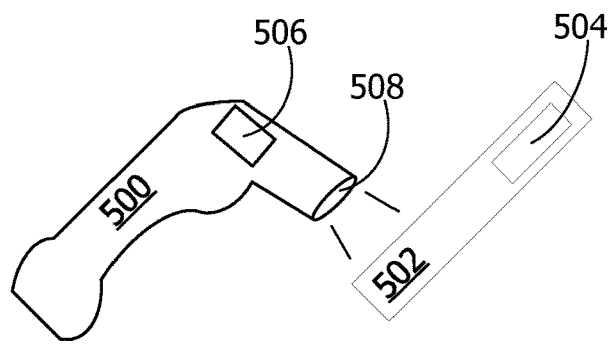
FIG. 5 is an exemplary block diagram illustrating a handheld scanner scanning a PID.

FIG. 5 is an exemplary block diagram illustrating a handheld scanner scanning a PID. The scanner 500 is a non-limiting example of a handheld scanner with built-in magnetic detection enabling the scanner to detect the location of the PID. In this non-limiting example, the PID is a UPC.

The handheld scanner 500 scans item 502 for a PID 504. In this example, the PID 504 is not initially positioned within a readable proximity of the scanner 500. A set of sensors 508 detects the PID 504 to generate sensor data. The signal generator determines the location of the PID from the detected sensor data. A signal component 506 generates a PID location indication.

In this example, the signal component 506 may be implemented as a visual indicator, such as a light that flashes as the scanner 500 moves toward the location of PID 504. In one example, the signal component 506 is an LED light that flashes with an increasing on/off frequency indicating a direction and/or proximity of the UPC location.

In another example, the scanner includes an LED light projection indicating a physical direction in which the scanner should move to approach the UPC location and/or decrease a distance between the scanner and the UPC. In another example, the scanner includes a display outputting at least one directional arrow indicating a recommended direction of movement to place the scanner in readable proximity to the UPC.

In other examples, the signal component 506 is implemented as a speaker for outputting an audible location indication. In one example, the scanner beeps with increasing frequency as the scanner approaches proximity of the PID location.

In still other examples, the signal component 506 is a visual output device, such as a display screen. The visual signal component may output an arrow indicating the PID is located in an upward direction/indicating an upward direction of movement towards the PID 504.

Figure 6:
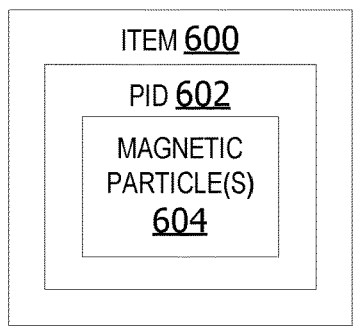
FIG. 6 is an exemplary PID including magnetic particles.

FIG. 6 is an exemplary PID including magnetic particles. An item 600 includes a PID 602. In this example, the magnetic particles 604 are included on or within the PID 602 associated with item 600. The magnetic particles 604 may be metallic or non-metallic. For example, the magnetic particles 604 may be plastic magnetic particles.

In other examples, the PID includes one or more metallic particles. The metallic particles may be magnetic or non-magnetic particles. In still other examples, the PID includes both metallic and magnetic particles.

Figure 7:
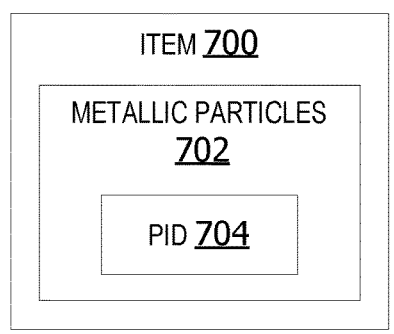
FIG. 7 is an exemplary PID associated with metallic particles.

FIG. 7 is an exemplary PID associated with metallic particles. The item 700 includes metallic particles 702 associated with PID 704. The metallic particles in this example are located near or in proximity to the PID instead of being located directly on or in the PID. For example, the metallic particles 702 may be included around a perimeter of the PID 704.

In other examples, the PID may be associated with magnetic particles. The magnetic particles may be metallic or non-metallic particles. In still other examples, the PID is associated with both metallic and magnetic particles.

Figure 8:
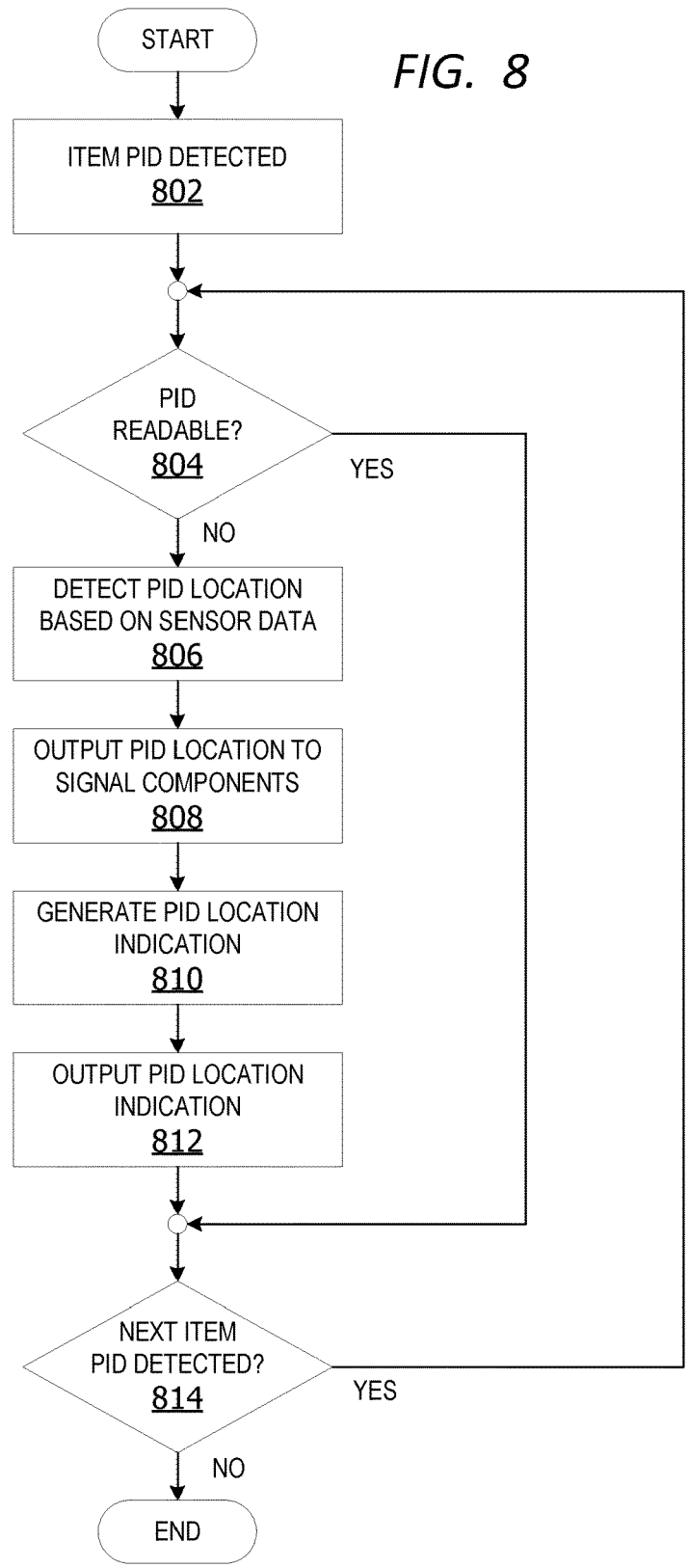
FIG. 8 is an exemplary flow chart illustrating operation of the computing device to output a PID location indication.

FIG. 8 is an exemplary flow chart illustrating operation of the computing device to output a PID location indication. The process shown in FIG. 8 may be performed by a signal generator executing on a computing device, such as, but not limited to, the signal generator 124 in FIG. 1. The computing device may be implemented as a computing device such as, but not limited to, the computing device 102 and/or handheld scanner 108 in FIG. 1, handheld scanner 200 in FIG. 2, system 300 in FIG. 3, system 400 in FIG. 4, and/or handheld scanner 500 in FIG. 5. Further, execution of the operations illustrated in FIG. 8 is not limited to a signal generator. One or more computer-readable storage media storing computer-readable instructions may execute to cause at least one processor to implement the operations illustrated in FIG. 8.

The process begins by detecting an item PID by a scanning system at operation 802. The scanning system may be an automatic scanning system, such as system 100 in FIG. 1, for example, detecting an item PID using one or more sensors. A determination is made as to whether a PID is readable by a scanner component of the system at operation 804. If yes, the process proceeds to operation 814 below. If no, a PID location is determined by a signal generator based on sensor data at operation 806. The PID location is output by the signal generator to one or more signal components at operation 808. A PID location indication is generated by the one or more signal components at operation 810. The generated PID location indication is output at operation 812. The generated PID location indication may be output to a user interface, such as user interface 118 in FIG. 1, or to a set of signal components, such as set of signal components 130 in FIG. 1, or to a user interface via a set of signal components, as described above.

A determination is made as to whether a next item PID is detected at operation 814. If yes, the process iteratively repeats operations 804 through 814 until no additional item PIDs are detected. If no, the process terminates thereafter.

While the operations illustrated in FIG. 8 are performed by a computing device or server, aspects of the disclosure contemplate performance of the operations by other entities. For example, a cloud service may perform one or more of the operations.

Figure 9:
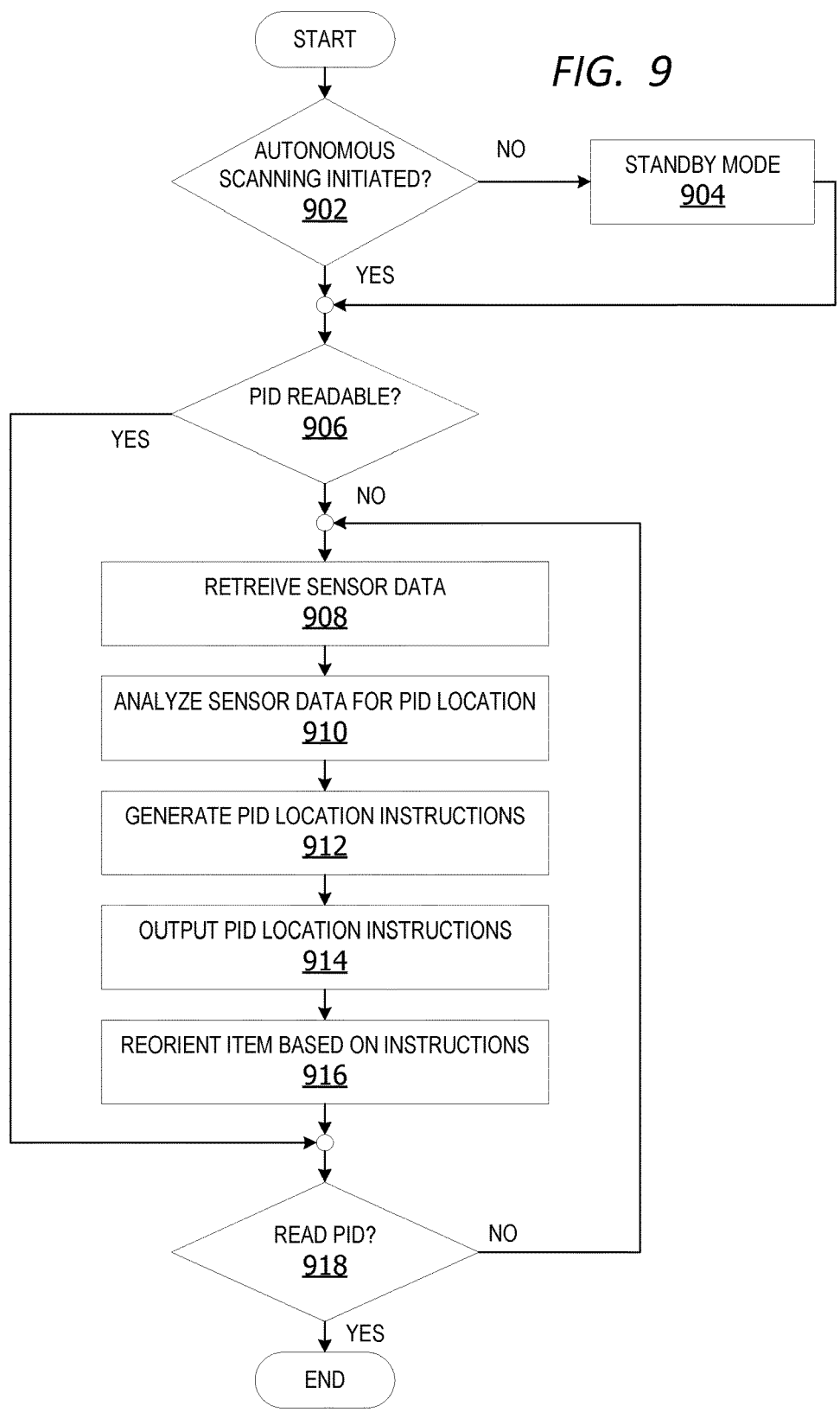
FIG. 9 is an exemplary flow chart illustrating operation of the computing device for automatic PID scanning.

FIG. 9 is an exemplary flow chart illustrating operation of the computing device for autonomous PID scanning. The process shown in FIG. 9 may be performed in part by a signal generator executing on a computing device, such as, but not limited to, the signal generator 124 in FIG. 1. The computing device may be implemented as a computing device such as, but not limited to, the computing device 102 in FIG. 1, handheld scanner 200 in FIG. 2, system 300 in FIG. 3, system 400 in FIG. 4, and/or handheld scanner 500 in FIG. 5. Further, execution of the operations illustrated in FIG. 9 is not limited to a signal generator. One or more computer-readable storage media storing computer-readable instructions may execute to cause at least one processor to implement the operations illustrated in FIG. 9.

The process begins by determining whether item scanning is initiated at operation 902. In some examples, scanning is initiated by turning a scanning component on or otherwise activating a scanner. In other examples, scanning is initiated by detecting an item in proximity of a scanner device. If no, the scanner component goes into a standby mode at operation 904.

When scanning is initiated, a determination is made as to whether a PID is readable by a scanner component at operation 906. If yes, the process goes to operation 918. If no, sensor data is retrieved at operation 908. Sensor data may be retrieved from one or more sensors, such as set of sensors 128 in FIG. 1, set of sensors 310 in FIG. 3, or set of sensors 402 in FIG. 4, for example. The sensor data is analyzed to identify PID location at 910. The sensor data may be analyzed by a signal generator, such as signal generator 440 in FIG. 4 for example, to determine a PID location relative to the associated item.

Instructions are generated by one or more signal components based on the PID location at 912. The PID location may be provided by the signal generator to the one or more signal components. The instructions include directions to orient the item and/or PID to improve readability of the PID by the scanner component. The instructions are output to an orientation component at 914. The orientation component may be an autonomous device, such as a robotic arm, a mechanical arm, motorized rollers, or other actuator device platform, or any other suitable component for manipulating an object using the instructions received. The item is autonomously reoriented by the orientation component based on the instructions at 916. A determination is made as to whether the PID is read by the scanner component at 918. If no, the process returns to 908 and iteratively repeats operations 908 through 918 until the PID is read at 918. If yes, the process terminates thereafter.

While the operations illustrated in FIG. 9 are performed by a computing device or server, aspects of the disclosure contemplate performance of the operations by other entities. For example, a cloud service may perform one or more of the operations.

Additional Examples

Alternatively, or in addition to the other examples described herein, examples include any combination of the following:

a PID which includes at least one of a universal product code (UPC), or a matrix barcode;
a PID includes or is associated with magnetic particles;
PID includes or is associated with metallic particles;
one or more sensors include at least one of a proximity sensor, a magnetic sensor, an inductive sensor, or a capacitive sensor;
one or more signal components include at least one of a visual component, an audible component, or a haptic component;
wherein the output indication of the detected location is directed towards a direction of movement corresponding to the handheld scanning device, such that movement in the direction indicated brings the scanner component into readable proximity of the PID;
wherein the one or more signal components is an audible component and wherein the output indication is an audible tone configured to increase in frequency relative to the proximity of the handheld scanning device with the detected PID;
wherein the one or more signal components is a visual component comprising at least one light and wherein the output indication is a change in state of the at least one light in a frequency that increases correspondingly to the proximity of the handheld scanning device with the detected PID;
one or more sensors configured to detect a location of a PID relative to an item;
one or more signal components configured to output an indication of the detected location relative to the item;
an orientation component configured to physically orient the item for scanning based on the output indication of the detected location relative to the item;
a scanner component configured to read a PID associated with an item, wherein the orientation component orients the item to facilitate readability of the PID by the scanner component;

wherein the orientation component comprises at least one of a robotic arm, a mechanical arm, motorized rollers, or other actuator device;

wherein the one or more sensors include at least one of a proximity sensor, a magnetic sensor, an inductive sensor, or a capacitive sensor;

wherein the one or more signal components include at least one of a user interface, a display, or a communication channel;

wherein the output indication of the detected location is provided as orientation instructions;

detect a location of a PID relative to an item associated with the PID using sensor data from one or more sensors;

generate an indication of the detected location;

output the generated indication via a user interface component;

wherein the location is detected based at least in part on magnetic or metallic elements associated with the PID;

wherein generated indication comprises orientation instructions for orienting the item to facilitate readability of the PID by a scanner component;

wherein the one or more sensors include at least one of a proximity sensor, a magnetic sensor, an inductive sensor, or a capacitive sensor; and controlling an autonomous orientation component using the generated indication to orient the item for facilitating scanning of the PID by a scanner component.

At least a portion of the functionality of the various elements in FIG. 1, FIG. 2, FIG. 3, FIG. 4, FIG. 5, FIG. 6, and FIG. 7 may be performed by other elements in FIG. 1, FIG. 2, FIG. 3, FIG. 4, FIG. 5, FIG. 6, and FIG. 7, or an entity (e.g., processor, web service, server, application program, computing device, etc.) not shown in FIG. 1, FIG. 2, FIG. 3, FIG. 4, FIG. 5, FIG. 6, and FIG. 7.

In some examples, the operations illustrated in FIG. 8 and FIG. 9 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for automated scanning of items using metal detection. For example, the elements illustrated in FIG. 1, FIG. 2, FIG. 3, FIG. 4, FIG. 5, FIG. 6, and FIG. 7, such as when encoded to perform the operations illustrated in FIG. 8 and FIG. 9, constitute exemplary means for reading a PID associated with an item; exemplary means for detecting a location of the PID relative to the item; and exemplary means for outputting an indication of the detected location relative to the item.

In another example, the elements illustrated in FIG. 1, FIG. 2, FIG. 3, FIG. 4, FIG. 5, FIG. 6, and FIG. 7, such as when encoded to perform the operations illustrated in FIG. 8 and FIG. 9, constitute exemplary means for detecting a location of a PID relative to an item; exemplary means for outputting an indication of the detected location relative to the item; exemplary means for physically orienting the item for scanning based on the output indication of the detected location relative to the item; and exemplary means for reading a PID associated with the item.

In another example, the elements illustrated in FIG. 1, FIG. 2, FIG. 3, FIG. 4, FIG. 5, FIG. 6, and FIG. 7, such as when encoded to perform the operations illustrated in FIG. 8 and FIG. 9, constitute exemplary means for detecting a location of a PID relative to an item associated with the PID using sensor data from one or more sensors; exemplary means for generating an indication of the detected location; and exemplary means for outputting the generated indication via a user interface component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A handheld scanning device comprising:
    a scanner component configured to read a physical identifier (PID) associated with an item;
    one or more sensors configured to detect a location of the PID relative to the item; and
    one or more signal components configured to output an indication of the detected location of the PID relative to the item, the output indication of the detected location directed towards a direction of movement corresponding to the handheld scanning device, such that movement in the direction indicated brings the scanner component into readable proximity of the PID, wherein the one or more signal components includes a haptic component and wherein the output indication includes haptic output configured to increase in intensity relative to a proximity of the scanner component with the detected PID.

2. The handheld scanning device of claim 1, wherein the PID comprises at least one of a universal product code (UPC) or a matrix barcode.

3. The handheld scanning device of claim 1, wherein the PID includes or is associated with magnetic particles.

4. The handheld scanning device of claim 1, wherein the PID includes or is associated with metallic particles.

5. The handheld scanning device of claim 1, wherein the one or more sensors include at least one of a proximity sensor, a magnetic sensor, an inductive sensor, or a capacitive sensor.

6. The handheld scanning device of claim 1, wherein the one or more signal components include at least one of a visual component, an audible component, or a haptic component.

7. The handheld scanning device of claim 1, wherein the output indication is output to one or more user interface components.

8. The handheld scanning device of claim 1, wherein the one or more signal components is an audible component and wherein the output indication is an audible tone configured to increase in frequency relative to the proximity of the scanner component with the detected PID.

9. The handheld scanning device of claim 1, wherein the one or more signal components is a visual component comprising at least one light and wherein the output indication is a change in state of the at least one light in a frequency that increases correspondingly to the proximity of the scanner component with the detected PID.

10. An automated scanning system comprising:
    a scanner component configured to read a physical identifier (PID) associated with an item;
    one or more sensors configured to detect a location of the PID relative to the item;
    one or more signal components configured to output an indication of the detected location relative to the item, the output indication of the detected location provided as orientation instructions; and
    an orientation component configured to physically orient the item to facilitate readability of the PID by the scanner component based on the output indication of the detected location relative to the item, wherein the orientation component comprises at least one of a robotic arm, a mechanical arm, motorized rollers, or other actuator device.

11. The automated scanning system of claim 10, further comprising:
    a user interface, wherein the user interface receives the output indication responsive to an unsuccessful read of the PID after the orientation component physically re-orients the item.

12. The automated scanning system of claim 10, wherein the one or more sensors include at least one of a proximity sensor, a magnetic sensor, an inductive sensor, or a capacitive sensor.

13. The automated scanning system of claim 10, wherein the one or more signal components include at least one of a user interface, a display, or a communication channel.

14. The automated scanning system of claim 10, wherein the PID comprises at least one of a universal product code (UPC) or a matrix barcode.

15. One or more computer storage devices having computer-executable instructions stored thereon for autonomous scanning, which, on execution by a computer, cause the computer to perform operations comprising:
    detecting a location of a physical identifier (PID) relative to an item associated with the PID using sensor data from one or more sensors;
    generating an indication of the detected location; and
    controlling an autonomous orientation component using the generated indication to orient the item for facilitating scanning of the PID by a scanner component, wherein the autonomous orientation component comprises at least one of a robotic arm, a mechanical arm, motorized rollers, or other actuator device.

16. The one or more computer storage devices of claim 15, wherein the location is detected based at least in part on magnetic or metallic elements associated with the PID.

17. The one or more computer storage devices of claim 15, wherein generated indication comprises orientation instructions for orienting the item to facilitate readability of the PID by a scanner component.

18. The one or more computer storage devices of claim 15, wherein the one or more sensors include at least one of a proximity sensor, a magnetic sensor, an inductive sensor, or a capacitive sensor.

19. The one or more computer storage devices of claim 15 having further executable instructions comprising:
   outputting the generated indication via a user interface component.

* * * * *